Nov. 13, 1956   F. R. MARGREY   2,770,142
PULLEY GUIDE
Filed June 3, 1954
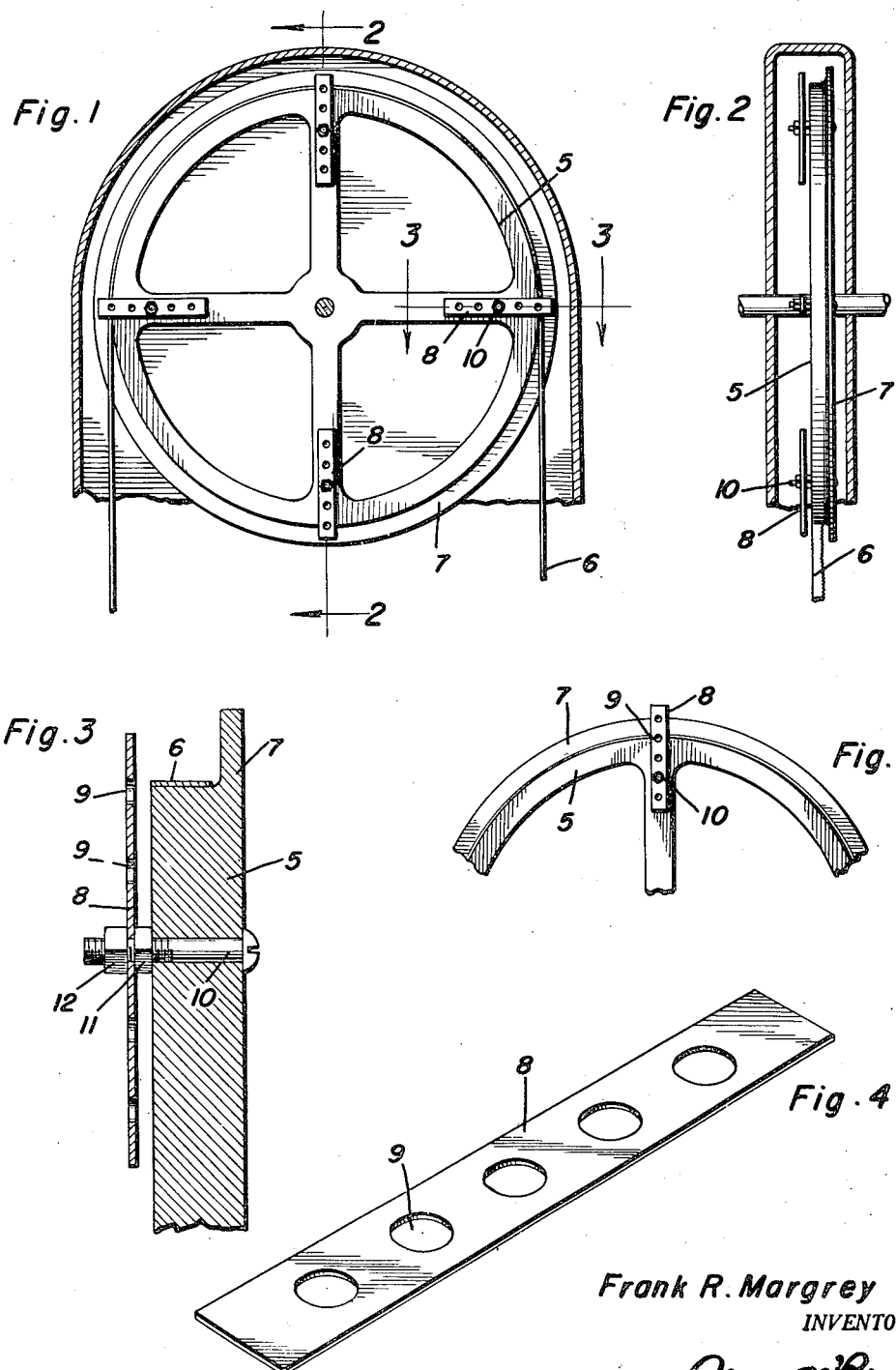
Frank R. Margrey
INVENTOR.

2,770,142

PULLEY GUIDE

Frank R. Margrey, Chittenango, N. Y.

Application June 3, 1954, Serial No. 434,276

1 Claim. (Cl. 74—240)

The present invention relates to new and useful improvements in guide attachments for pulleys to keep a power band saw or belt from slipping off the pulley.

In certain types of power band saws, such as meat saws, the pulleys for the saw are constructed with a single flange, thus leaving the saw free to slide off the pulley and accordingly it is an object of the present invention to provide guide means to retain the saw on the pulley.

Another object is to provide guide means attached to the pulley in a manner to easily and quickly release the saw for removing the latter when desired.

A further object is to provide an attachment of this character of simple and practical construction, which is efficient and reliable in operation, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a side elevational view of the pulley showing the guide means thereon;

Figure 2 is a sectional view taken on line 2—2 of Figure 1;

Figure 3 is an enlarged fragmentary sectional view taken on line 3—3 of Figure 1;

Figure 4 is an enlarged perspective view of one of the guides, and

Figure 5 is a fragmentary side elevational view showing the guide in adjusted position.

Referring now to the drawings in detail, wherein for the purpose of illustration I have disclosed a preferred embodiment of my invention, the numeral 5 designates a pulley for a band saw 6 and the pulley is constructed with a single flange 7 to facilitate placing the saw thereon and for removing the saw therefrom.

In order to prevent accidental slipping of the saw off the open side of the pulley I provide a plurality of guides constructed of relatively short metal straps 8 each having a longitudinally arranged row of openings 9 to selectively receive a bolt 10 which is attached to the pulley to secure the guides in a radially outwardly projecting position adjacent the periphery of the pulley to retain the saw thereon.

The attaching means for the guide includes a rear nut 11 threaded on the bolt behind the guide and tightened against the pulley to hold the bolt thereon and a front nut 12 threaded on the bolt and tightened against the guide. The front nut 12 may be loosened and tightened against the guide. The front nut 12 may be loosened without loosening the bolt to swing the guide away from its saw retaining position when it is desired to remove the saw, or the front nut may be completely removed to adjust the guide inwardly or outwardly on the pulley, when desired.

A suitable number of the guides may be attached to the pulley sufficient to retain the saw in position and are preferably arranged on the pulley in a manner to avoid throwing the same out of balance. The guides may also be used for balancing the pulley by adjusting the guides inwardly or outwardly as found necessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In combination, a pulley of the type having a single flange, an attachment comprising an elongated plate having a longitudinal row of openings, and fastening means carried by the pulley and engaged in a selected opening to secure the plate in a radially outwardly extending adjusted position at the periphery of the pulley and spaced from the flange thereof to retain a flexible member on the pulley between the flange and the plate.

References Cited in the file of this patent

UNITED STATES PATENTS

| 457,644 | Hampton | Aug. 11, 1891 |
| 1,128,879 | Isaacson | Feb. 16, 1915 |
| 1,589,291 | Carlson | June 15, 1926 |
| 1,593,751 | Carter | July 27, 1926 |
| 1,694,350 | Bloss | Dec. 4, 1928 |
| 2,494,676 | Van Der Schuur | Jan. 17, 1950 |
| 2,574,883 | Medal | Nov. 13, 1951 |